US012784164B2

(12) United States Patent
Keller et al.

(10) Patent No.: US 12,784,164 B2
(45) Date of Patent: Nov. 3, 2026

(54) SYSTEMS AND METHODS FOR ASSESSING DEVIATIONS OF A SURFACE FROM A DESIGN PLAN

(71) Applicant: KCI Holdings, Inc., Sparks, MD (US)

(72) Inventors: Karl Keller, Sparks, MD (US); James W. Clay, III, Lawrenceville, GA (US)

(73) Assignee: KCI HOLDINGS, INC., Sparks, MD (US)

( * ) Notice: Subject to any disclaimer, the term of this patent is extended or adjusted under 35 U.S.C. 154(b) by 100 days.

(21) Appl. No.: 18/611,820

(22) Filed: Mar. 21, 2024

(65) Prior Publication Data

US 2024/0320813 A1 Sep. 26, 2024

Related U.S. Application Data

(60) Provisional application No. 63/491,417, filed on Mar. 21, 2023.

(51) Int. Cl.
*G06T 7/00* (2017.01)
*G06T 3/40* (2006.01)
(Continued)

(52) U.S. Cl.
CPC ............. *G06T 7/0002* (2013.01); *G06T 3/40* (2013.01); *G06T 7/73* (2017.01); *G06T 17/00* (2013.01);
(Continued)

(58) Field of Classification Search
CPC ........... G06T 7/0002; G06T 3/40; G06T 7/73; G06T 17/00; G06T 2207/10028;
(Continued)

(56) References Cited

U.S. PATENT DOCUMENTS

| | | | | |
|---|---|---|---|---|
| 9,633,483 | B1 * | 4/2017 | Xu | G06F 18/24 |
| 2009/0232388 | A1 * | 9/2009 | Minear | G06T 7/32 382/154 |
| 2020/0314435 | A1 * | 10/2020 | Tourapis | G06T 7/74 |

OTHER PUBLICATIONS

Stojanovic, V., et al. "A service-oriented indoor point cloud processing pipeline." The International Archives of the Photogrammetry, Remote Sensing and Spatial Information Sciences 42 (2019): 339-346. (Year: 2019).*

(Continued)

*Primary Examiner* — Daniel F Hajnik
*Assistant Examiner* — Chris Alejandro Puntier
(74) *Attorney, Agent, or Firm* — FINNEGAN, HENDERSON, FARABOW, GARRETT & DUNNER LLP

(57) ABSTRACT

Systems and methods for assessing deviations of a surface from a design plan are provided. Disclosed embodiments may involve receiving, from a scanning system, a point cloud associated with a surface, the point cloud including a discrete set of data points. Disclosed embodiments may involve sorting, using a k-dimensional tree, and downsampling, using voxels, the discrete set of data points. Disclosed embodiments may involve producing a voxel grid geometry. Further, disclosed embodiments may involve superimposing, using the k-dimensional tree, the voxel grid geometry and the point cloud and producing data by computing normal, curvature, and spherical coordinates using both the point cloud and the voxel grid geometry separately. Further, disclosed embodiments may involve determining, using the voxel grid geometry and k-dimensional tree, point-by-point deflection.

15 Claims, 6 Drawing Sheets

(51) Int. Cl.
*G06T 7/73* (2017.01)
*G06T 17/00* (2006.01)

(52) U.S. Cl.
CPC .......................... *G06T 2207/10028* (2013.01); *G06T 2210/04* (2013.01); *G06T 2210/56* (2013.01)

(58) Field of Classification Search
CPC ............. G06T 2210/04; G06T 2210/56; G06T 2207/30132; G06T 7/001
See application file for complete search history.

(56) References Cited

OTHER PUBLICATIONS

Li, Fangxin, et al. "Laser scanning based surface flatness measurement using flat mirrors for enhancing scan coverage range." Remote Sensing 13.4 (2021): 714. (Year: 2021).*

Kumar, V. Vinod, G. R. N. Tagore, and A. Venugopal. "Some investigations on geometric conformity analysis of a 3-D freeform objects produced by rapid prototyping (FDM) process." Int J Appl Res Mech Eng 1.2 (2011): 82-86. (Year: 2011).*

* cited by examiner

200

SYSTEMS AND METHODS FOR ASSESSING DEVIATIONS OF A SURFACE FROM A DESIGN PLAN

CROSS-REFERENCE TO RELATED APPLICATIONS

This application claims the benefit of priority to U.S. Provisional Application No. 63/491,417, filed Mar. 21, 2023, the contents of which is incorporated herein by reference in its entirety.

TECHNICAL FIELD AND BACKGROUND

Producing level and flat concrete surfaces has been the goal of concrete finishers since the first use of concrete for indoor finished surfaces. Producing level and flat slabs provides a flat surface for erecting vertical members and avoids the problem of water pooling on concrete surfaces. In the age of robotics, the use of robots for transporting materials across (for example, warehouse) floors at relatively high speed requires high accuracy, millimeter tolerances of the level and flatness of those floors and surfaces. Deviations in floor elevation can result in tipping, collision, and loss of loads (items/products), creating significant manufacturing and processing delays. This can cause a loss of revenue as impacted floors maybe shut down to clean up, repair, and/or replace resources and materials.

Existing technical standards formalize the assessment of level and flatness; the tolerances specified in those standards are often purpose driven. Generally, a standard specifies a sampling rate across a 2-dimensional floor, a 95th percentile deflection magnitude, a maximum deflection allowed when compared to the entire sample, and a vertical or z-axis position of the slab being tested. Assessing level and flatness should lead to an output of positions on the floor that can be remediated to improve the floor's overall conformance to a standard. Indeed, since there may be multiple remediations necessary to bring a non-conforming floor into tolerance, there is an opportunity to minimize the remediations by maximizing the correction of selected remediation locations.

Assessing level and flatness of concrete is the process of determining "deflections" at specific points on a floor. Determining levelness takes sparse, uniform samples across the floor surface to determine if the floor is a consistent elevation over a large distance. Flatness is more detailed and measures the "bumpiness" of the floor over shorter distances (relative to those distances involved in determining levelness). The deflections from either flatness or levelness can be tested to determine if they indicate a level or flat floor overall. For level testing, the magnitude of a deflection may include the difference in the elevation of a pair of neighboring points of the surface sample in an x- or y-direction of travel. For flatness testing, a deflection may include the difference of the elevation in a vector formed by a pair of neighboring points, in an x- or y-direction of travel, and a third, immediately neighboring point in the direction of the vector and travel. This is a measurement of the zenith distance. As used herein, a zenith distance may pertain to the angular distance of a point from neighboring points (e.g., 90° minus the point's altitude above a flat plane formed by z-axis coordinates of the neighboring points).

Various specifications—e.g., ASTM 1155, TR34 (created by standards bodies)—and custom specifications (created by builders with specific uses) have evolved to state explicitly what it means to be level or flat. In general, these methods sample the overall floor uniformly, determine the deflection at each sample point, and then test the set of deflections against an absolute, pass/fail tolerance. For example, the tolerance could be the number of millimeters of deflection allowed at the 95th percentile of the deflection set. To accomplish the sampling, most methods typically superimpose a full or partial grid of a specific grid size over the concrete surface where the x, y location of the grid points becomes the 2-dimensional sample point. Grid lines themselves define direction of travel and tolerances are defined for the entire grid at a specific percentile.

While TR34 requires a full grid across the entire floor, ASTM 1155 is somewhat easier to achieve in that it only requires points for grid lines that meet certain criteria. Non-limiting examples of criteria that are relevant are as follows: 1) grid lines must be more than 2 ft from columns, a wall, an edge, or a construction joint; 2) the grid must be more than 11 ft long; 3) grid lines in the x- or y-directions must be more than 4 ft apart; and 4) grid lines must be sampled at every 1 ft. While TR34 has grids that are either 3 m (level) or 300 mm (flat) squares, the ASTM 1155 standard has a non-uniform grid of 4 ft×1 ft oriented in either the x- or y-plane on the floor. Some of ASTM's specifications appear to entangle the dimensions of the envisioned measurement method (e.g., using a trolley) as part of the specification.

Further, most current/existing systems and methods often include assumptions that the elevation at a certain point can be measured at a required level of accuracy. How elevation is determined is often left unstated. However, a standard in the industry emerged in the initial years of level/flat testing that involves pulling a trolley down the lines of the superimposed grid and storing elevations at grid points as measured by its instrument (e.g., the trolley). An alternative approach, and based on more modern technology, is the use of three-dimensional (3D) Light Detection and Ranging (LIDAR) scanning technology to make those measurements and store the data, (x-, y-, and z-coordinates) as a "point cloud". A point cloud is a dense sample of the surface.

Unfortunately, large volumes of data collected by LIDAR was not foreseen by the writers of the current standards. Consequently, innovations are required to use point cloud data and sample it according to the standard. Because LIDAR is captured uniformly across the entire concrete surface, processing methods must be created that produce superimposed grids (based on the relevant standard) on the LIDAR generated point cloud. Those grid points inherit the properties (e.g., x, y, z values) of the LIDAR sampling points near them. With values for the grid points, the standards assessment of flatness can proceed.

For grid points that have accurate elevation values, existing standards employ two different methods for level and flatness deflection determination. Level determination calculates the difference between a specific grid point elevation value (z) and the z value of the next point in the direction of travel (the direction of travel being in an x- or y-direction). Flatness employs a vector method that uses the previous point (p−1) z value and the grid point (p) z value to compute an anchor vector. The zenith distance between the anchor vector and the point after the grid point (p+1) in the direction of travel (x- or y-direction) is the flatness deflection. These deflections are stored relative to their corresponding grid point. The standards typically have two requirements: 1) that the 95th percentile of the deflections be less than the stated tolerances for level and flatness; and 2) that the maximum deflection be less than the stated tolerance.

SUMMARY

Embodiments consistent with the present disclosure provide systems and methods relating to assessing deviations of a surface from a design plan. Methods consistent with the present disclosure may involve receiving, from a scanning system, a point cloud associated with a surface. The point cloud may include a discrete set of data points. Disclosed methods may further comprise sorting, using a k-dimensional tree, the discrete set of data points. The sorting may include organizing each data point of the discrete set of data points based on a plurality of nearest neighbors. Disclosed methods may further involve downsampling, using voxels, the discrete set of data points of the point cloud; and producing a voxel grid geometry. Further, methods consistent with disclosed embodiments may involve superimposing, using the k-dimensional tree, the voxel grid geometry and the point cloud. The superimposing may include a fast lookup of nearest neighbors. Methods of the present disclosure may involve producing data by computing normal, curvature, and spherical coordinates using both the point cloud and the voxel grid geometry separately. Disclosed methods may further involve determining, using the voxel grid geometry and k-dimensional tree, point-by-point deflection. The point-by-point deflection may represent a deviation of the surface from a design plan.

Consistent with disclosed embodiments, a system for assessing deviations of a surface from a design plan may comprise at least one processor. The at least one processor may be configured to receive, from a scanning system, a point cloud associated with a surface. The point cloud may include a discrete set of data points. The at least one processor may further be configured to sort, using a k-dimensional tree, the discrete set of data points. The sorting may include organizing each data point of the discrete set of data points based on a plurality of nearest neighbors. Consistent with disclosed embodiments, the at least one processor may be configured to downsample, using voxels, the discrete set of data points of the point cloud; and produce a voxel grid geometry. The at least one processor may be configured to superimpose, using the k-dimensional tree, the voxel grid geometry and the point cloud. The superimposing may include a fast lookup of nearest neighbors. Consistent with disclosed embodiments, the at least one processor may be configured to produce data by computing normal, curvature, and spherical coordinates using both the point cloud and the voxel grid geometry separately. Further, the at least one processor may be configured to determine, using the voxel grid geometry and k-dimensional tree, point-by-point deflection. The point-by-point deflection may represent a deviation of the surface from a design plan.

Consistent with disclosed embodiments, a system for assessing deviations of a surface from a design plan is disclosed. The system may include at least one processor configured to perform steps or operations. The at least one processor may be configured to receive, from a scanning system, a point cloud associated with a surface. The point cloud may include a discrete set of data points. The at least one processor may further be configured to sort, using a k-dimensional tree, the discrete set of data points. The sorting may include organizing each data point of the discrete set of data points based on a plurality of nearest neighbors. Consistent with disclosed embodiments, the at least one processor may be configured to downsample, using voxels, the discrete set of data points of the point cloud. The downsampling may involve: computing a plurality of first and second coordinates based on a plurality of two-dimensional centroids; computing a plurality of third coordinates, wherein computing a third coordinate of the plurality of third coordinates comprises calculating an average of nearest neighbor coordinate values of the third coordinate; and computing a normal vector, a curvature, and a spherical deflection for each two-dimensional centroid of the plurality of two-dimensional centroids. The at least one processor may be configured to produce a voxel grid geometry. Consistent with disclosed embodiments, the at least one processor may be configured to superimpose, using the k-dimensional tree, the voxel grid geometry and the point cloud. The superimposing may include a fast lookup of nearest neighbors. The at least one processor may be further configured to produce data by computing normal, curvature, and spherical coordinates using both the point cloud and the voxel grid geometry separately. Consistent with disclosed embodiments, the at least one processor may be configured to determine, using the voxel grid geometry and k-dimensional tree, point-by-point deflection. The point-by-point deflection may represent a deviation of the surface from a design plan. The at least one processor may be configured to identify, using the voxel grid geometry and k-dimensional tree, a remediation location. Consistent with disclosed embodiments, the at least one processor may be configured to determine a first and second coordinate associated with the remediation location; determine an amount of deflection associated with the remediation location; and transmit, to a remediation resource, the first and second coordinate and the amount of deflection.

BRIEF DESCRIPTION OF THE DRAWINGS

The accompanying drawings, which are incorporated in and constitute a part of this specification, illustrate disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

DETAILED DESCRIPTION

Figure 1:
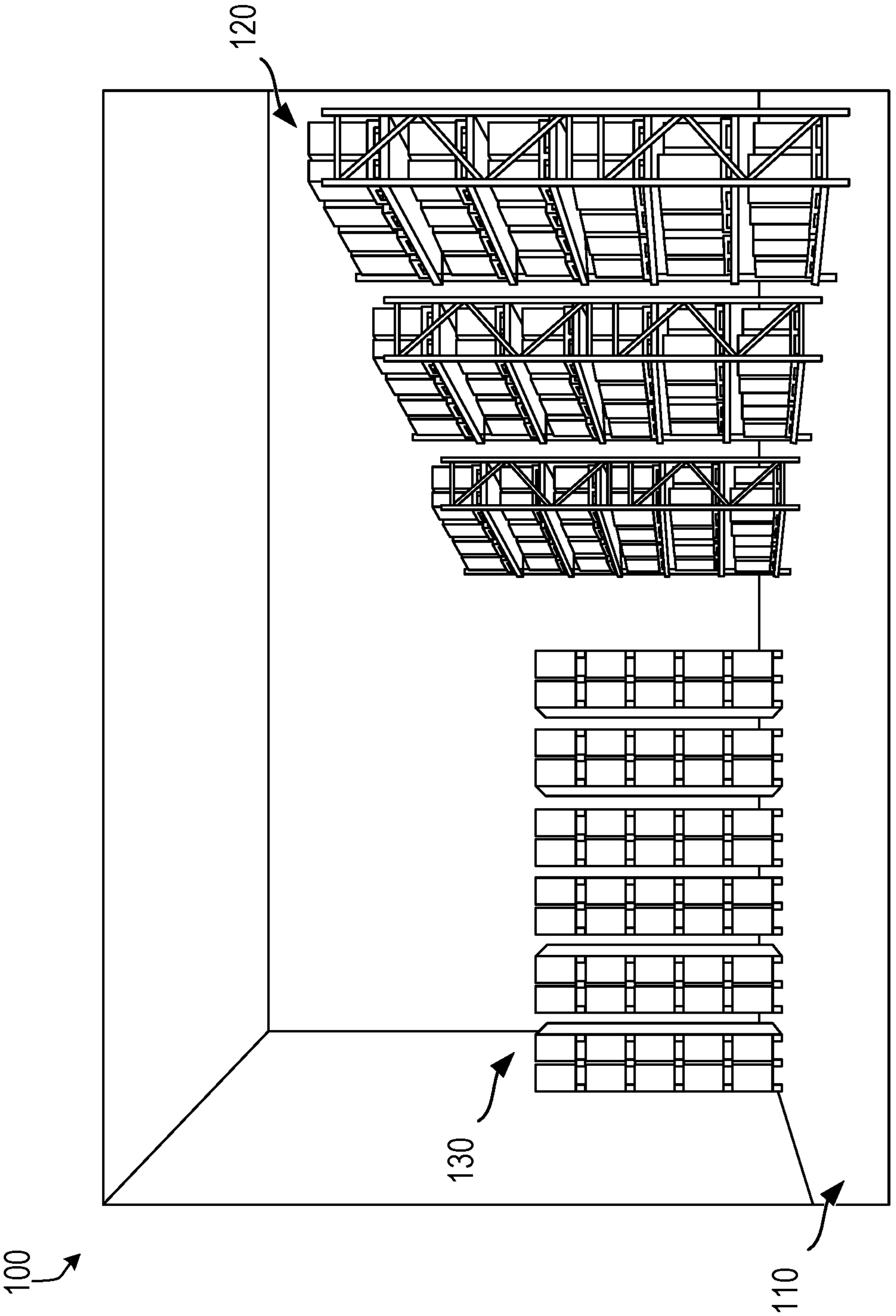
FIG. 1 illustrates an example of a warehouse, consistent with embodiments of the present disclosure.

Embodiments of the present disclosure relate to systems and methods for assessing deviations of a surface from a design plan. Consistent with disclosed embodiments, a system may comprise at least one processor configured to perform operations such as those discussed herein. It is also contemplated that a system may comprise at least one processor and a non-transitory computer readable medium configured to store instructions. The at least one processor may be configured to execute the instructions and may perform operations such as those discussed herein. The methods, operations, and steps in accordance with the teachings herein may be performed by a computer specially constructed or programmed to perform the described functions.

As discussed herein, disclosed embodiments may provide technical or technological improvements over traditional systems and methods of assessing deviations of a surface from a design plan by using point cloud data as a source for floor position/elevation. The point cloud data may require a mapping between a point cloud and a superimposed grid. Embodiments of the present disclosure may employ a novel approach using a voxelized grid produced from the point cloud and a K-Dimensional (KD) Tree. Voxelization may involve creating a grid, and the KD Tree may relate the grid to points in the point cloud based on a fast lookup of nearest neighbors. In some embodiments, the voxelized grid may be defined by an extent (e.g., 3 meters) and compute the x, y coordinates of a voxel based on a 2-dimension (2D) centroid. The z coordinate of the voxel may be computed as the average of nearest neighbor z coordinate values. For any given point in the voxelized grid, the KD tree may provide a fast lookup of the nearest neighbors based on a distance parameter and total number of neighboring points.

Additionally, the point cloud may be sampled by any dimension grid if the grid dimension is: 1) greater than the distance between points of the point cloud; and 2) smaller than the span of the point cloud. Current systems and methods typically arbitrarily employ or allow 1-2 sizes of grids (e.g., 3 meters or 300 millimeters).

Disclosed embodiments may provide technical or technical improvements over traditional systems and methods of assessing deviations of a surface from a design plan by producing equivalent (or better) results for deflection determination using standard methods while preserving exact x, y coordinate locations of a sampling point. Existing systems and methods using, for example, trolleys (devices designed for measurement of track geometry) cannot specify exact x, y coordinates. The preservation of the exact x, y coordinates allow remediation resources to proceed directly to the point (s) on the floor/surface to be remediated with a known amount of remediation to be applied or achieved.

Additionally, disclosed embodiments may produce results that can be aggregated at any level of detail. Because of the underlying point cloud and mapping to grids, sparse grids can be formed from denser grids.

While traditional systems and methods rely on traversals of a grid in a specific order in both the x- and y-directions, embodiments of the present disclosure may process any point in the voxelized grid in any order and product the same (or better) results. Thus, embodiments of the systems and methods disclosed herein may produce results at a faster speed (e.g., the at least one processor may perform the operations or produce results more quickly than traditional systems and methods).

Additionally, embodiments of the present disclosure may be modular and employ classes and Point Data Abstraction Library (PDAL) pipelines to define computations. For example, systems and methods discussed herein may execute a full workflow (or pipeline) from an initial registration of the point cloud to an output of actionable results that pinpoint remediation points on, for example, a warehouse floor. Disclosed embodiments may also be parallelizable and distributed over multiple machines.

Disclosed embodiments may produce adjunct and more abstract representations of levelness and/or flatness. Non-limiting examples of these representations include: a normal vector (e.g., an eigenvector corresponding to the covariance matrix of a nearest neighbor set), curvature (e.g., the ratio of the minimal eigen value and the sum of the eigenvalues of the eigenvector), and spherical psi deflections from the normal vector (e.g., the angular deviation of the normal vector from the true normal of the cloud). The curvature and spherical psi (e.g., spherical deflection) may be computed continuously as concrete (for example, of a floor) is created, allowing for ongoing refinement of concrete surfaces as opposed to (or prior to) post-hardened remediation. This may reduce the amount of post-hardened remediation required, reducing cost and increasing efficiency.

Additionally, or alternatively, systems and methods disclosed herein can be used to measure the deviations of any surface from a design plan. Thus, embodiments discussed herein may be used for non-flat surfaces to assess their deviation from a particular design plan, whether the design plan includes flat or level surfaces, intentionally non-flat or non-level surfaces, or any combination thereof.

Systems disclosed herein may involve one or more of a scanning system, a computer (or computational device), and a remediation resource. Non-limiting examples of scanning systems described herein include Light Detection and Ranging (LIDAR) systems, parallel beam scanning systems (PBSS), trolleys, and/or other optical systems for capturing and reproducing an environment (e.g., 3D scanners). Non-limiting examples of remediation resources may include a concrete grinder, a floor leveler, a floor patch, and/or any other device for adjusting the levelness or flatness of a particular area of a floor/surface. Additionally, or alternatively, the remediation resource may include a second computer or computational device configured to receive, for example, remediation instructions. The computers described herein may be specially constructed or programmed to perform the described functions (e.g., the methods disclosed herein). Additionally, or alternatively, the methods described herein may be performed by the scanning system, the specialized computer, and the remediation resource, in any combination.

Consistent with disclosed embodiments, computers of disclosed systems may employ a PDAL pipeline to define computations. A PDAL pipeline is a python list that contains one or many dictionary data structures. Dictionary constructs are key:value pairs. Each dictionary construct represents a "stage" of the pipeline. For example, a pipeline may ingest a file in a specific format, transform the data in that file, and output that transformed data in a formatted file.

The first stage of the pipeline may involve the computer reading a file into memory. PDAL may convert point cloud files with dimensions into an array of vectors, with one vector for (or corresponding to) each dimension. The computer may pass this array in memory to the next stage. The second stage may involve the computer applying a filter to the array. The filter may be a python program that computes spherical coordinates from the cloud. This computer may pass this modified array in memory to the final stage. The final stage may involve the computer writing the array out to a file and preserving a specified level of precision in doing so.

Consistent with embodiments of the present disclosure, a workflow pipeline may embody the primary stages necessary to produce a level/flat analysis from a given point cloud(s). That workflow pipeline may be incorporated in and executed by a computer, consistent with disclosed systems. The workflow pipeline may be performed at a higher level than the PDAL pipelines and each stage may incorporate zero or many PDAL pipelines. The stages of the workflow pipeline may include—but are not limited to—registration, cleaning, merging, decimation, estimation of normals (normals estimation), computation of sphericals (sphericals computation), and standards analysis.

Registration may involve the alignment of neighboring clouds. For example, work may be delivered as a set of point clouds without absolute coordinates for alignment. Registration may involve performing a pairwise process that finds common features among neighboring clouds (as determined by an order of capture) and computes a transformation that minimizes the total error. That transformation may be applied to the registered point cloud to translate and rotate its coordinates to minimize the error between point clouds.

Cleaning may involve reducing the point cloud to the floor features only. Since LIDAR scanning captures point clouds in three dimensions (3D), features such as walls, ceilings, stairwells, and items on the floor should be removed. This removal of features interacting with, but not part of, the floor or surface may be performed by systems and methods disclosed herein.

Merging may involve combining the cleaned, registered clouds into a single point cloud. Decimation of a point cloud may involve that point cloud's total number of points based on a maximum accuracy achievable from a scanning process (e.g., 2.5 millimeters at 80 feet). Normals estimation may involve computing the eigenvector of the covariance of nearest neighbors for each point in the point cloud. In some embodiments, curvature may be a by-product of normals estimation and may also be added to the point cloud. Sphericals computation may involve converting the normal vector into spherical coordinates and producing three new dimensions for the point cloud. Standards analysis may involve performing the level/flat computation based on a particular specification (e.g., ASTM 1155, TR34).

Voxelization may involve sampling the point cloud in three dimensions at a specified level of granularity (e.g., 3 meters, 3 millimeters). The coordinate of a voxel may be the centroid of the points contained in the voxel area, with each voxel's z coordinate modified to be the average of the N nearest neighbors. N may be a variable assigned by the user. The voxelized point cloud may be used as a grid representation of the point cloud, where each vertex of the grid is a voxel point.

K-Dimensional (KD) trees may be used to provide a fast lookup of nearest neighbors of points in the point cloud and points in the voxelized grids.

The normal vector to a point may be the eigenvector of the covariance matrix of the point and its nearest neighbors. A user may specify the number of nearest neighbors (N). The eigenvector may represent a vector such that the covariance matrix can be reduced to scalar values (e.g., the eigenvalues).

Curvature determined at a point may involve the ratio of the minimum eigenvalue to the sum of the eigenvalues that characterizes the level/flat of a point in the point cloud or grid. It has been shown that curvature may be a substitute for the values computed by the standards analysis.

Spherical coordinates may be an alternative coordinate system for the normal vector, where the latter is typically given in cartesian coordinates. The angle between the normal vector and vertical (the normal of the point cloud) may be of particular importance. This value, psi (w), may represent the deflection of the normal to the point from the cloud normal and may be another way to characterize level/flat.

FIG. 1 illustrates an example of a warehouse 100, consistent with embodiments of the present disclosure. As shown in FIG. 1, warehouse 100 may include a floor 110, shelves 120, and boxes 130. Floor 110 may be concrete, but it is contemplated that the floor or surface may be of any suitable material (e.g., wood, vinyl, porcelain, stone, linoleum). As discussed above, robots or other vehicles may traverse floor 110 at high speeds, requiring high accuracy, millimeter tolerances of the level and flatness of floor 110.

Figure 2:
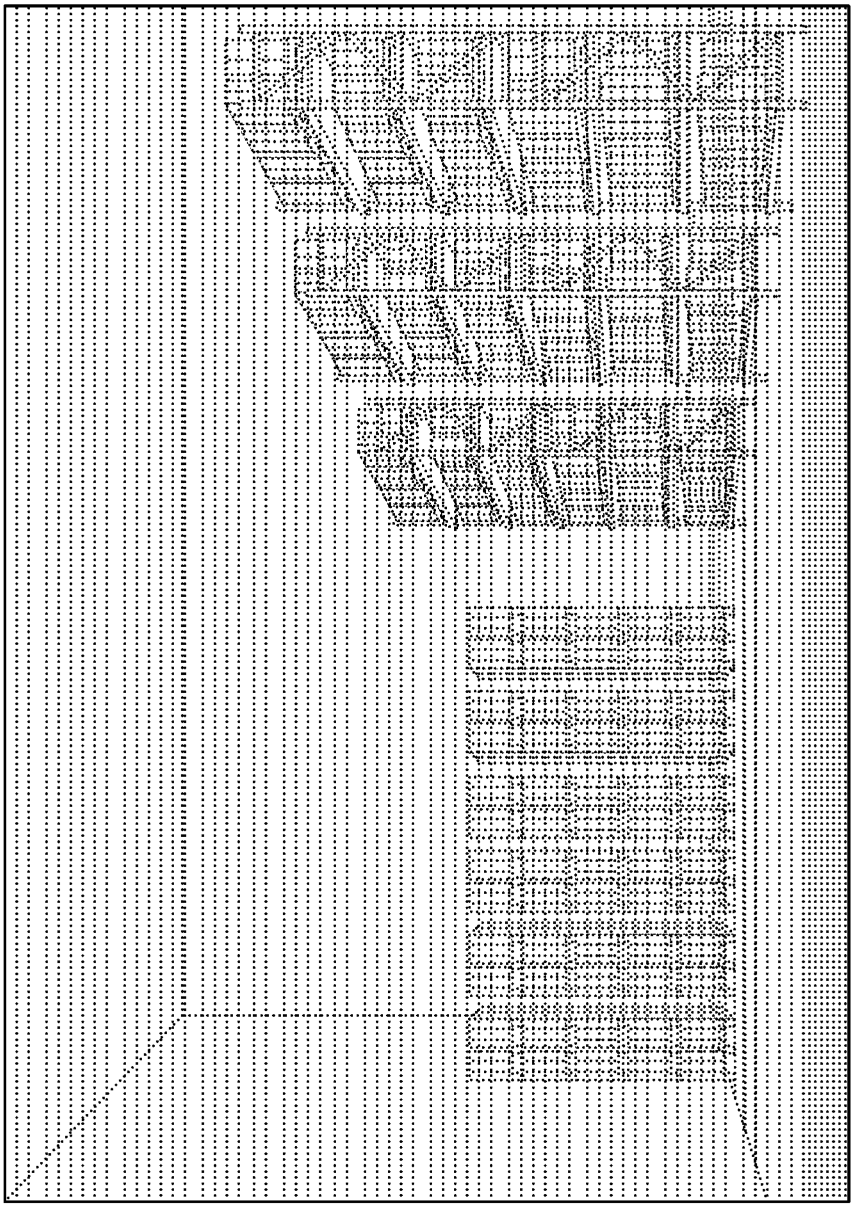
FIG. 2 illustrates an example of a point cloud of the warehouse of FIG. 1, consistent with embodiments of the present disclosure.

FIG. 2 illustrates an example of a point cloud 200 of the warehouse 100 of FIG. 1, consistent with embodiments of the present disclosure. Consistent with disclosed embodiments, a scanning system may scan or generate a point cloud associated with a surface. For example, as shown in FIG. 2, a LIDAR system may scan and generate a point cloud 200 associated with warehouse 100. Point cloud 200 may include a discrete set of data points. The scanning system may transmit or send point cloud 200 to a computer, and that computer may sort, using a K-Dimensional (KD) tree, the discrete set of data points. The sorting may involve organizing each data point of the discrete set of data points based on a plurality of nearest neighbors.

Figure 3:
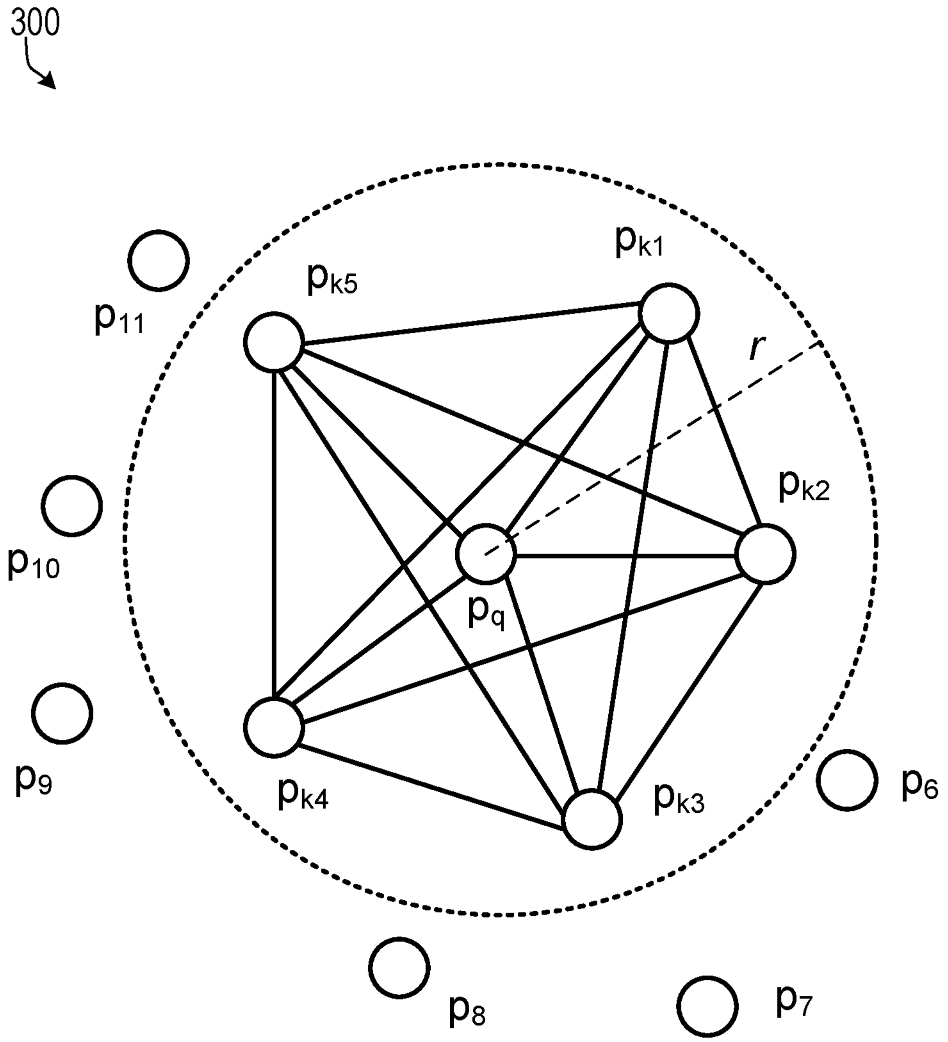
FIG. 3 illustrates an example diagram of estimating a normal in a point cloud, consistent with embodiments of the present disclosure.

For example, FIG. 3 illustrates an example diagram 300 of estimating a normal in a point cloud, consistent with embodiments of the present disclosure. In some embodiments, a Point Feature Histogram (PFH) representation may be used to show relationships between points in a k-neighborhood and their estimated surface normals. As shown in FIG. 3, a query point ($p_q$) may be the center of a circle (or a sphere in 3D) with radius r and its k neighbors (e.g., points with distances smaller than radius r). For example, points $p_{k1}$, $p_{k2}$, $p_{k3}$, $p_{k4}$, and $p_{k5}$ may be the k neighbors of $p_q$. Those points that are the k neighbors of $p_q$ may be fully interconnected in a mesh, as shown in FIG. 3. Points outside of radius r from $p_q$ (e.g., $p_6$, $p_7$, $p_8$, $p_9$, $p_{10}$, $p_{11}$) may not be considered when determining a normal of $p_q$. Thus, a point's k-neighborhood geometrical properties may be used to generalize a mean curvature around that point using a multi-dimensional histogram of values (not shown).

In disclosed embodiments, the computer may choose the k-neighborhood of points based on a maximum number of neighborhood points to consider and/or a particular radial distance surrounding the query point (or reference point). Further, the influence of the normals of each neighborhood point (k neighbors) on the reference (query) point may be computed by the computer and used in sorting the discrete set of data points.

Figure 4:
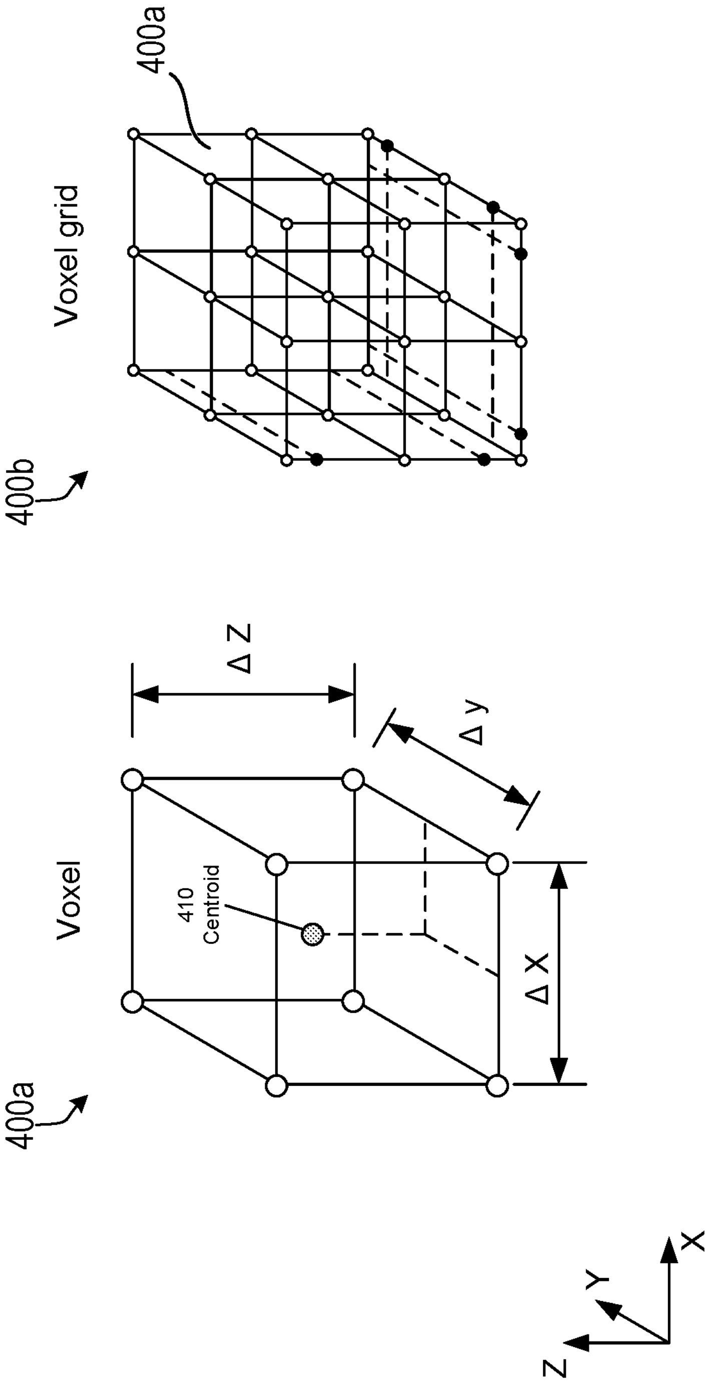
FIG. 4 illustrates examples of a voxel grid and voxel, consistent with embodiments of the present disclosure.

Additionally, the computer may downsample the discrete set of data points of the point cloud using voxels. As discussed herein, voxels may pertain to a value on a regular grid in three-dimensional (3D) space. For example, FIG. 4 illustrates examples of a voxel grid and voxel, consistent with embodiments of the present disclosure. As shown in FIG. 4, voxel 400*a* may appear as a three-dimensional cube located on a three-dimensional grid with a centroid 410 defining the coordinate(s) of the voxel 400*a*. A three-dimensional model, such as a voxel grid geometry 400*b*, may be created of voxels 400*a*. Thus, the computer may produce a voxel grid geometry by downsampling the discrete set of data points of the point cloud using voxels. The three-dimensional model (e.g., voxel grid geometry) may be stored in the memory of, for example, the computer, consistent with systems and methods disclosed herein.

Figure 5:
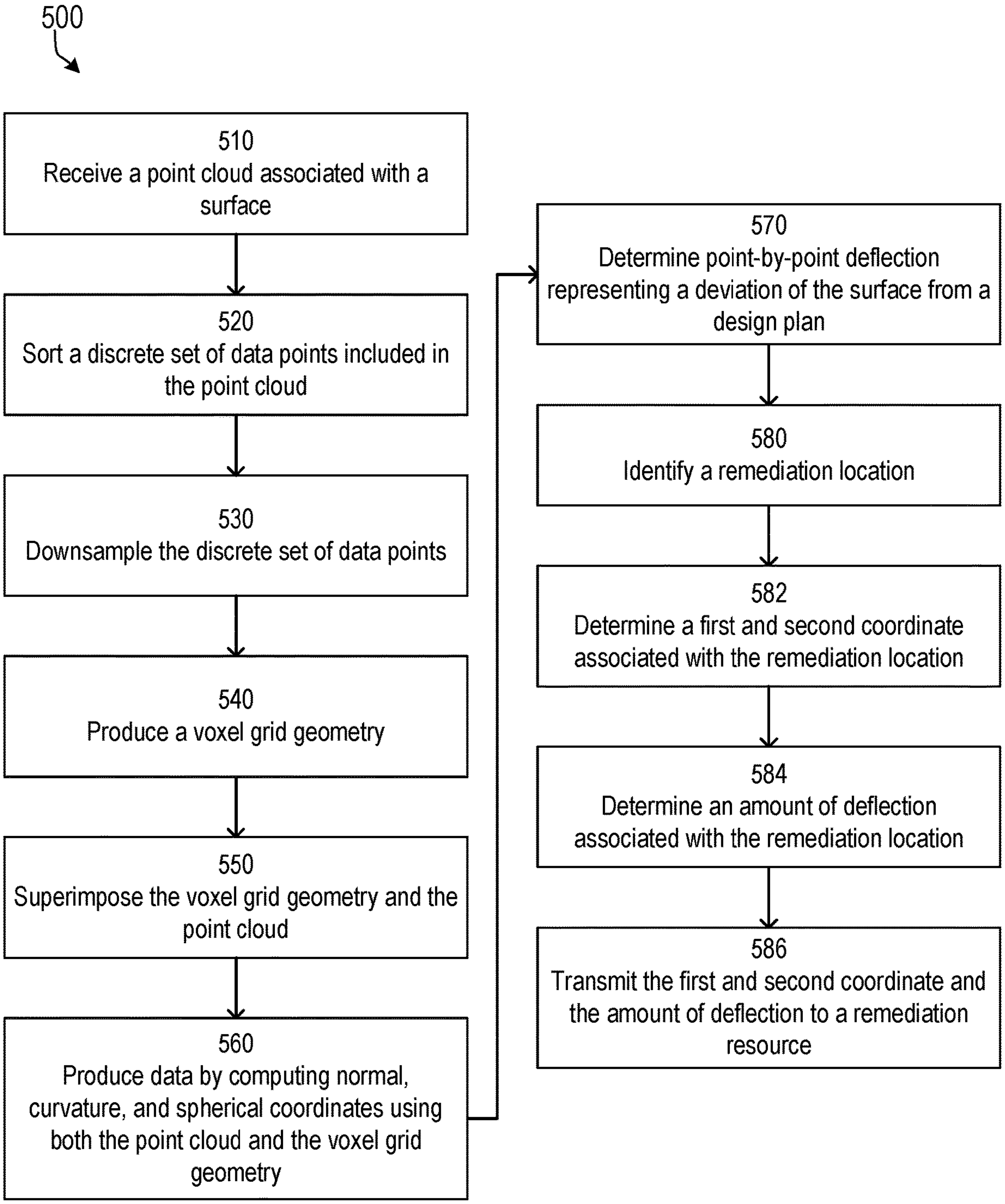
FIG. 5 depicts a flowchart of an example method for assessing deviations of a surface from a design plan, consistent with embodiments of the present disclosure.

FIG. 5 depicts a flowchart of an example method 500 for assessing deviations of a surface from a design plan, consistent with embodiments of the present disclosure. As an example, a computer may implement the steps of method 500 to assess deviations of a surface from a design plane. As discussed above with respect to FIG. 2, the computer may receive a point cloud associated with a surface (step 510). For example, a scanning system may create the point cloud by scanning the environment and transmit the point cloud to the computer (as, e.g., a 3D file). The point cloud may include a discrete set of data points.

Additionally, as discussed above with respect to FIG. 3, the computer may sort, using a k-dimensional tree, the discrete set of data points included in the point cloud (step 520). The k-dimensional tree may organize (or sort) the points of the point cloud in a k-dimensional space. For example, the sorting may include organizing each data point of the discrete set of data points based on a plurality of nearest neighbors.

As discussed with respect to FIG. 4, the computer may downsample the discrete set of data points of the point cloud (step 530) using voxels. The sorting of the data points using the k-dimensional tree and the downsampling of the data points using voxels may transform the point cloud into (or produce) a voxel grid geometry (step 540), as discussed above with respect to FIG. 4. The voxel grid geometry may be defined by a size (e.g., 3 meters, 300 millimeters).

Further, the computer may superimpose the voxel grid geometry and the point cloud using the k-dimensional tree (step 550), and the superimposing may include or employ a fast lookup of nearest neighbors. The fast lookup of nearest neighbors may be based on a distance parameter (e.g., a radius r) and/or a maximum number of neighboring points, as discussed above with respect to FIG. 3. As an example, the superimposing may involve overlaying the voxel grid geometry on top of the point cloud. The k-dimensional tree may assist in organizing data points of the point cloud and voxels of the voxel grid geometry, such that the overlay is accurate.

As shown in method 500 of FIG. 5, disclosed embodiments may also produce data by computing normal, curvature, and spherical coordinates using both the point cloud and the voxel grid geometry (step 560). The normal, curvature, and spherical coordinates may be calculated for each discrete data point of the point cloud and/or each centroid of each voxel of the voxel grid geometry. That computing may involve using the point cloud and the voxel grid geometry separately.

Embodiments of the present disclosure may determine point-by-point deflection using the voxel grid geometry and k-dimensional tree (step 570). The point-by-point deflection may represent a deviation of a surface from a design plan.

As further shown in method 500 of FIG. 5, embodiments of the present disclosure may identify a remediation location (step 580) using the voxel grid geometry and the k-dimensional tree.

Disclosed embodiments may determine a first and second coordinate associated with the remediation location (step 582). For example, the first coordinate may be an x-coordinate and the second coordinate may be a y-coordinate. These coordinates may correspond to a location on a surface or floor that is uneven (e.g., has a bump, divot, or other shape that deviates from a particular design plan) or otherwise requires remediation. Disclosed embodiments may also determine an amount of deflection associated with the remediation location (step 584). The amount of deflection may be determined by, or may be represented by, a z-coordinate, a zenith distance, a curvature, and/or a spherical coordinate. Further, disclosed embodiments may transmit, to a remediation resource, the first and second coordinate and the amount of deflection (step 586). For example, the x- and y-coordinates, along with the amount of deflection, may be transmitted to a remediation resource.

Figure 6:
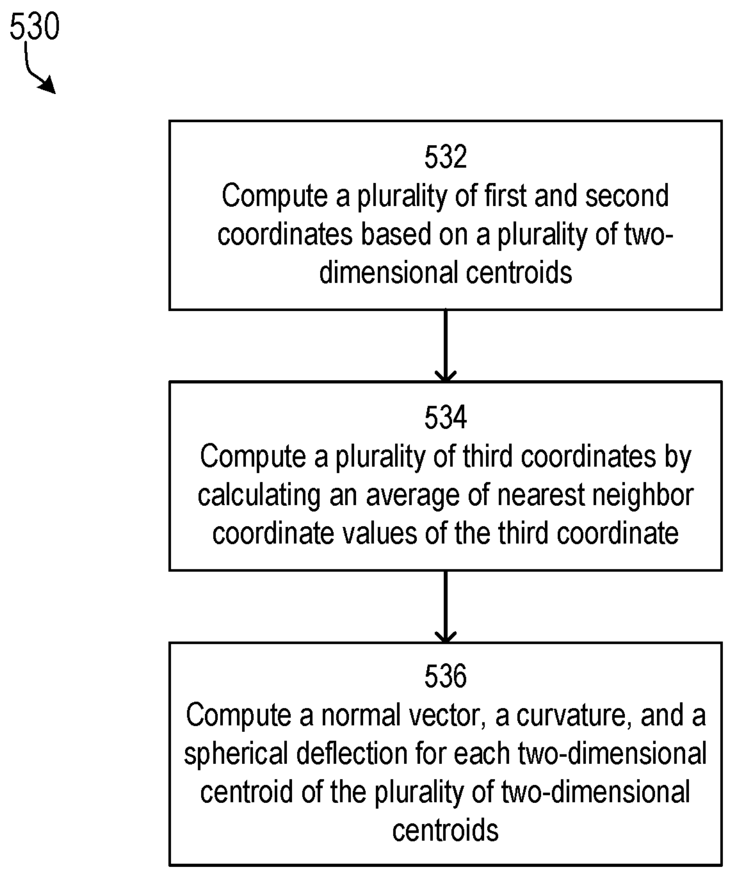
FIG. 6 depicts a flowchart of an example method for downsampling, consistent with embodiments of the present disclosure.

FIG. 6 depicts a flowchart of an example method for downsampling, consistent with embodiments of the present disclosure. As discussed above with respect to FIG. 5, a computer may downsample a discrete set of data points of a point cloud (step 530) using voxels.

The downsampling 530 performed by the computer may involve a plurality of computations. For example, as shown in FIG. 6, the computer may compute a plurality of first and second coordinates based on a plurality of two-dimensional centroids (step 532). As an example, the plurality of first and second coordinates may be a plurality of x-coordinates and y-coordinates, those x- and y-coordinates forming pairs, where each x- and y-coordinate pair corresponds to a two-dimensional centroid. As discussed above, a coordinate of a voxel (of, for example, a voxel grid geometry) may be the centroid of the points contained in a respective voxel area. Thus, each two-dimensional centroid of the plurality of two-dimensional centroids may correspond to a particular voxel in the voxel grid geometry to be produced, and each first and second coordinate may be an x- and y-coordinate representation of the location of each voxel.

Further, the computer may compute a plurality of third coordinates by calculating an average of nearest neighbor coordinate values of the third coordinate (step 534). For example, each third coordinate may be a z-coordinate corresponding to each two-dimensional centroid. It is also contemplated that the third coordinate may also be a zenith coordinate or a spherical coordinate. Thus, the computer may determine the vertical height of a surface or floor at a particular x, y location (that corresponds to a voxel of the voxel grid geometry to be produced). In some embodiments, this may be used to determine an amount of deflection at a particular (reference) point, the amount of deflection being relative to a design plan and/or neighboring points of the particular (reference) point. For example, the computer may determine the point-by-point deflection (step 570 of FIG. 5) based on the third coordinate, the voxel grid geometry, the k-dimensional tree, and methods in a standard specification (e.g., ASTM 1155, TR34). In some embodiments, the downsampling 530 performed by the computer may further involve computing a normal vector, a curvature, and a spherical deflection for each two-dimensional centroid of the plurality of two-dimensional centroids (step 536). Further, in some embodiments, and as discussed above, the computer may continuously compute the curvature and the spherical deflection as the surface is constructed.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numeric values within that range. For example, description of a range such as from 1 to 6 should be considered to include subranges such as from 1 to 3, from 1 to 4, from 1 to 5, from 2 to 4, from 2 to 6, from 3 to 6, and so forth, as well as individual numbers within that range, for example, 1, 2, 3, 4, 5, and 6. This applies regardless of the breadth of the range.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for assessing deviations of a surface from a design plan, the method comprising:

receiving, from a scanning system, a point cloud associated with a surface, wherein the point cloud includes a discrete set of data points;

sorting, using a k-dimensional tree, the discrete set of data points, wherein the sorting includes organizing each data point of the discrete set of data points based on a plurality of nearest neighbors;

downsampling, using voxels, the discrete set of data points of the point cloud;

producing a voxel grid geometry, wherein the voxel grid geometry is defined by a size, and wherein the downsampling includes computing a plurality of first and second coordinates based on a plurality of two-dimensional centroids, wherein the downsampling comprises computing a normal vector, a curvature, and a spherical deflection for each two-dimensional centroid of the plurality of two-dimensional centroids, and wherein the curvature and spherical deflection is computed continuously as the surface is constructed;

superimposing, using the k-dimensional tree, the voxel grid geometry and the point cloud, the superimposing including a fast lookup of nearest neighbors;

producing data by computing normal, curvature, and spherical coordinates using both the point cloud and the voxel grid geometry separately; and determining, using the voxel grid geometry and k-dimensional tree, point-by-point deflection, wherein the point-by-point deflection represents a deviation of the surface from a design plan.

2. The method of claim 1, wherein the downsampling comprises computing a plurality of third coordinates, and wherein computing a third coordinate of the plurality of third coordinates comprises calculating an average of nearest neighbor coordinate values of the third coordinate.

3. The method of claim 2, wherein the point-by-point deflection is determined based on the third coordinate, the voxel grid geometry, the k-dimensional tree, and methods in a standard specification.

4. The method of claim 1, wherein the fast lookup of nearest neighbors is based on a distance parameter and a maximum number of neighboring points.

5. The method of claim 1, wherein the surface is a concrete surface.

6. The method of claim 1, wherein the scanning system includes a LIDAR system.

7. The method of claim 1, the method further comprising:

identifying, using the voxel grid geometry and the k-dimensional tree, a remediation location;

determining a first and second coordinate associated with the remediation location;

determining an amount of deflection associated with the remediation location; and transmitting, to a remediation resource, the first and second coordinate and the amount of deflection.

8. A system for assessing deviations of a surface from a design plan, the system comprising:

at least one processor configured to:

receive, from a scanning system, a point cloud associated with a surface, wherein the point cloud includes a discrete set of data points;

sort, using a k-dimensional tree, the discrete set of data points, wherein the sorting includes organizing each data point of the discrete set of data points based on a plurality of nearest neighbors;

downsample, using voxels, the discrete set of data points of the point cloud;

produce a voxel grid geometry, wherein the voxel grid geometry is defined by a size, and wherein the downsampling includes computing a plurality of first and second coordinates based on a plurality of two-dimensional centroids, wherein the downsampling comprises computing a normal vector, a curvature, and a spherical deflection for each two-dimensional centroid of the plurality of two-dimensional centroids, and wherein the curvature and spherical deflection is computed continuously as the surface is constructed;

superimpose, using the k-dimensional tree, the voxel grid geometry and the point cloud, the superimposing including a fast lookup of nearest neighbors;

produce data by computing normal, curvature, and spherical coordinates using both the point cloud and the voxel grid geometry separately; and determine, using the voxel grid geometry and k-dimensional tree, point-by-point deflection, wherein the point-by-point deflection represents a deviation of the surface from a design plan.

9. The system of claim 8, wherein the downsampling comprises computing a plurality of third coordinates, and wherein computing a third coordinate of the plurality of third coordinates comprises calculating an average of nearest neighbor coordinate values of the third coordinate.

10. The system of claim 9, wherein the point-by-point deflection is determined based on the third coordinate, the voxel grid geometry, the k-dimensional tree, and methods in a standard specification.

11. The system of claim 8, wherein the fast lookup of nearest neighbors is based on a distance parameter and a maximum number of neighboring points.

12. The system of claim 8, wherein the surface is a concrete surface.

13. The system of claim 8, wherein the scanning system includes a LIDAR system.

14. The system of claim 8, wherein the at least one processor is further configured to:

identify, using the voxel grid geometry and the k-dimensional tree, a remediation location;

determine a first and second coordinate and an amount of deflection associated with the remediation location;

determine an amount of deflection associated with the remediation location; and transmit, to a remediation resource, the first and second coordinate and the amount of deflection.

15. A system for assessing deviations of a surface from a design plan, the system comprising:

at least one processor configured to:

receive, from a scanning system, a point cloud associated with a surface, wherein the point cloud includes a discrete set of data points;

sort, using a k-dimensional tree, the discrete set of data points, wherein the sorting includes organizing each data point of the discrete set of data points based on a plurality of nearest neighbors;

downsample, using voxels, the discrete set of data points of the point cloud, by:

computing a plurality of first and second coordinates based on a plurality of two-dimensional centroids;

computing a plurality of third coordinates, wherein computing a third coordinate of the plurality of third coordinates comprises calculating an average of nearest neighbor coordinate values of the third coordinate; and computing a normal vector, a curvature, and a spherical deflection for each two-dimensional centroid of the plurality of two-dimensional centroids, wherein the curvature and spherical deflection is computed continuously as the surface is constructed;

produce a voxel grid geometry, wherein the voxel grid geometry is defined by a size;

superimpose, using the k-dimensional tree, the voxel grid geometry and the point cloud, the superimposing including a fast lookup of nearest neighbors;

produce data by computing normal, curvature, and spherical coordinates using both the point cloud and the voxel grid geometry separately;

determine, using the voxel grid geometry and k-dimensional tree, point-by-point deflection, wherein the point-by-point deflection represents a deviation of the surface from a design plan;

identify, using the voxel grid geometry and the k-dimensional tree, a remediation location;

determine a first and second coordinate associated with the remediation location;

determine an amount of deflection associated with the remediation location; and transmit, to a remediation resource, the first and second coordinate and the amount of deflection.

* * * * *